US007305156B2

(12) United States Patent
Mohammed

(10) Patent No.: US 7,305,156 B2
(45) Date of Patent: Dec. 4, 2007

(54) OPTICAL SUB-ASSEMBLY

(75) Inventor: Edris M. Mohammed, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 11/092,055

(22) Filed: Mar. 29, 2005

(65) Prior Publication Data

US 2006/0222284 A1 Oct. 5, 2006

(51) Int. Cl.
*G02B 6/12* (2006.01)
*G02B 6/43* (2006.01)

(52) U.S. Cl. .............................. 385/14; 385/88; 385/89

(58) Field of Classification Search .................. 385/14, 385/88–94
See application file for complete search history.

(56) References Cited

U.S. PATENT DOCUMENTS

| | | | |
|---|---|---|---|
| 5,625,734 A | | 4/1997 | Thomas et al. |
| 6,336,816 B1 * | | 1/2002 | Yatskov et al. ............... 439/67 |
| 6,470,117 B1 * | | 10/2002 | Tang et al. .................... 385/43 |
| 6,736,552 B2 * | | 5/2004 | Martwick ...................... 385/88 |
| 6,834,133 B1 * | | 12/2004 | Towle et al. ................... 385/14 |
| 2003/0185484 A1 * | | 10/2003 | Chakravorty et al. ......... 385/14 |
| 2003/0201462 A1 | | 10/2003 | Pommer et al. |
| 2005/0245103 A1 * | | 11/2005 | Ellison ......................... 439/61 |
| 2005/0249450 A1 * | | 11/2005 | Schrodinger .................. 385/14 |
| 2006/0002663 A1 * | | 1/2006 | Posamentier .................. 385/88 |

FOREIGN PATENT DOCUMENTS

EP 1429164 6/2004

* cited by examiner

*Primary Examiner*—Tina M. Wong
(74) *Attorney, Agent, or Firm*—Blakely, Sokoloff, Taylor & Zafman LLP

(57) ABSTRACT

A system is disclosed. The system includes a printed circuit board (PCB), a substrate mounted on the PCB, an integrated circuit (IC) mounted on the substrate, an optoelectronic sub-assembly mounted on the substrate and coupled to the IC; and a waveguide patterned on the substrate.

18 Claims, 4 Drawing Sheets

OPTICAL SUB-ASSEMBLY

FIELD OF THE INVENTION

The present invention relates to optical interconnects; more particularly, the present invention relates to coupling radiant energy from an integrated circuit to a waveguide.

BACKGROUND

More frequently, optical input/output (I/O) is being used in computer systems to transmit data between system components. Optical I/O is able to attain higher system bandwidth with lower electromagnetic interference than conventional I/O methods. In order to implement optical I/O, radiant energy is coupled from a waveguide to an optoelectronic integrated circuit (IC).

In optical interconnect systems the coupling of light from an optoelectronic IC to waveguides (or fibers) is important to minimize the total optical loss of the system. However, this is not always possible since such coupling depends on the specific architecture implemented and the optical components used. This coupling loss minimization results in reduction in total system power budget. Such conservation of total dissipated power is even more important for ultra short reach (USR) optical interconnect applications.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

According to one embodiment, an optical sub-assembly is disclosed. Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Figure 1:
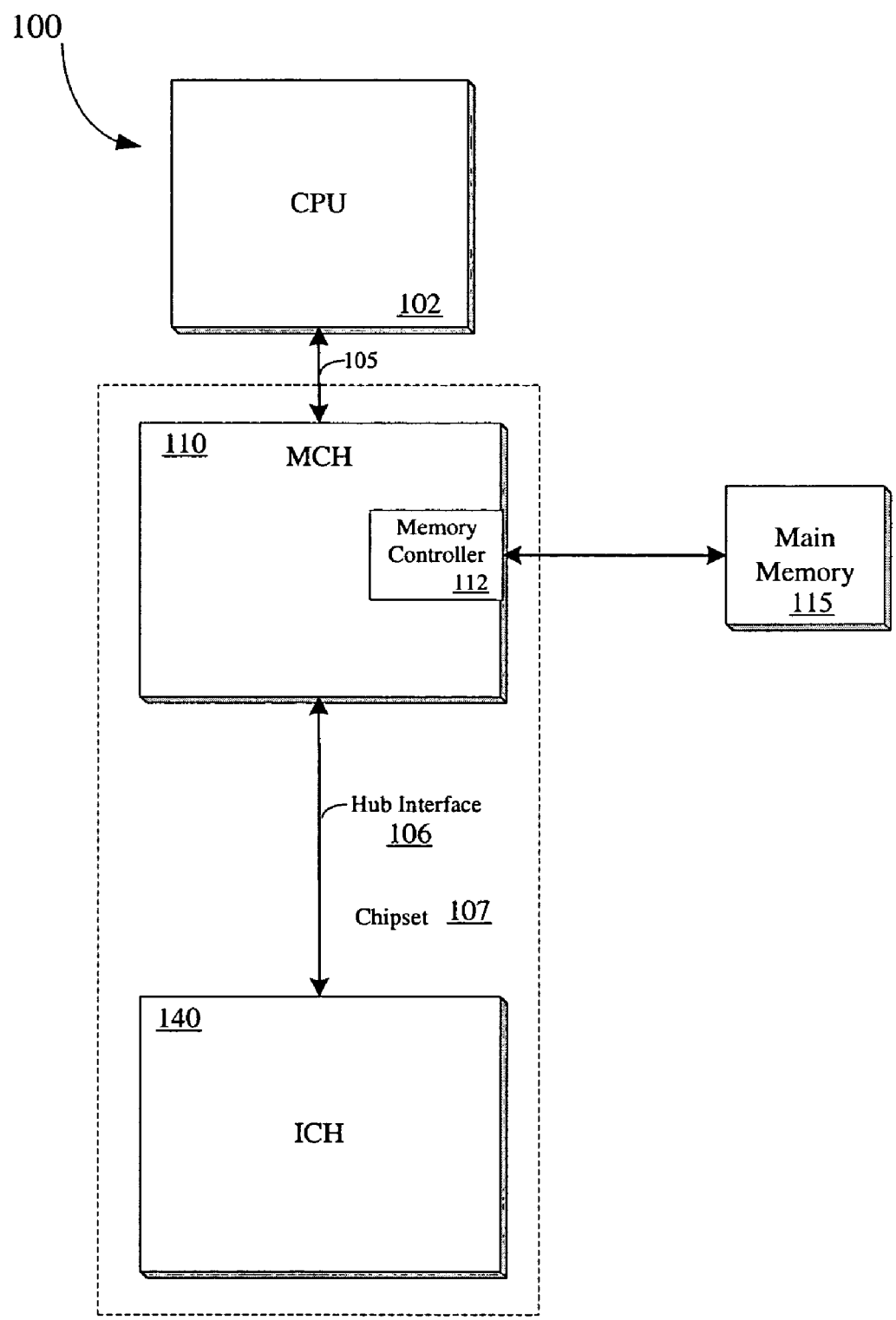
FIG. 1 illustrates one embodiment of a computer system.

FIG. 1 is a block diagram of one embodiment of a computer system 100. Computer system 100 includes a central processing unit (CPU) 102 coupled to a bus 105. In one embodiment, CPU 102 is a processor in the Pentium® family of processors including the Pentium® II processor family, Pentium® III processors, and Pentium® IV processors available from Intel Corporation of Santa Clara, Calif. Alternatively, other CPUs may be used.

According to one embodiment, bus 105 is a front side bus (FSB) that communicates with a memory control hub (MCH) 110 component of a chipset 107. MCH 110 includes a memory controller 112 that is coupled to a main system memory 115. Main system memory 115 stores data and sequences of instructions and code represented by data signals that may be executed by CPU 102 or any other device included in system 100.

In one embodiment, main system memory 115 includes dynamic random access memory (DRAM); however, main system memory 115 may be implemented using other memory types. According to one embodiment, MCH 110 is coupled to an input/output control hub (ICH) 140 via a hub interface 106. ICH 140 provides an interface to input/output (I/O) devices within computer system 100.

Figure 2:
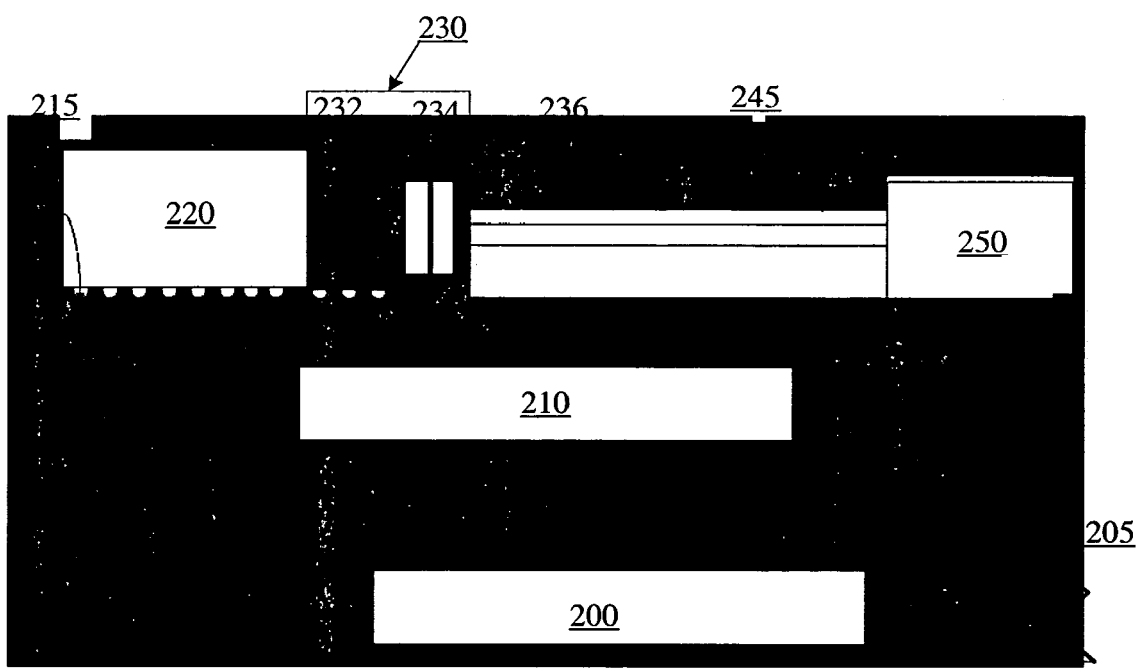
FIG. 2 illustrates a side view of one embodiment of an integrated optical package.

FIG. 2 illustrates a side view of one embodiment of an optical sub-assembly mounted on a substrate package. In one embodiment, the optical sub-assembly package may be implemented to couple optical I/O between components within computer system 100. For instance, the optical sub-assembly package may couple optical I/O between CPU 102 and MCH 110, and/or MCH 110 and main memory 115. In other embodiments, the optical sub-assembly package may couple a component within computer system 100 to another computer system.

Referring to FIG. 2, a package substrate 210 is mounted on a printed circuit board (PCB) 200. In between PCB 200 and substrate 210 is a ball grid array (BGA) 205 to provide conductivity between PCB 200 and substrate 210. An integrated circuit (IC) 220 is mounted on substrate 210 via solder bumps 215. In one embodiment, IC 220 is a computer system 100 IC component, such as CPU 102, MCH 110, ICH 140, etc.

According to one embodiment, optical sub-assembly 230 is coupled to IC 220. Optical sub-assembly 230 includes an electrical interconnect 232, glass substrate 234 and die 236. Interconnect 232 couples IC 220 to glass substrate 234 and is used to transmit high-speed electrical signals to optoelectronic dies mounted on it. In one embodiment, interconnect 232 is a flexible, high-frequency, PCB. Glass substrate 234 is mounted on interconnect 232. In one embodiment, glass substrate 234 is patterned with electrodes and bumps that are used as electrical contacts.

Die 236 is mounted on glass substrate 234. In one embodiment, die 236 is flip-chip mounted on glass substrate 234. In a further embodiment, glass substrate 234 is larger in size than die 236. According to one embodiment, die 236 is an optoelectronic IC that transmits and receives optical I/O. In a further embodiment, die 236 is a vertical cavity surface emitting laser (VCSEL). However, in other embodiments die 236 may be implemented as a photodetector, or any other optoelectronic device.

Die 236 receives an optical input from a waveguide mounted on substrate 210 and converts the input data to an electrical format. In addition, die 236 receives an electrical output from IC 220 and converts to an optical signal transmitted through waveguide 245 to an optical connector 250, also mounted on substrate 210.

According to one embodiment, waveguide 245 is directly fabricated on the surface of substrate 210. Thus, waveguide 245 is patterned from the substrate 210 during fabrication of the package. Consequently, optical subassembly 230 is enabled to couple directly to waveguide 245 in order to take advantage of attributes of die 236. In one embodiment, optical subassembly 230 turns "electrons up" to establish complete alignment of the optic axis of die 236 and waveguide 245. In one embodiment, a solder self-alignment technique facilitates the alignment.

Figure 3:
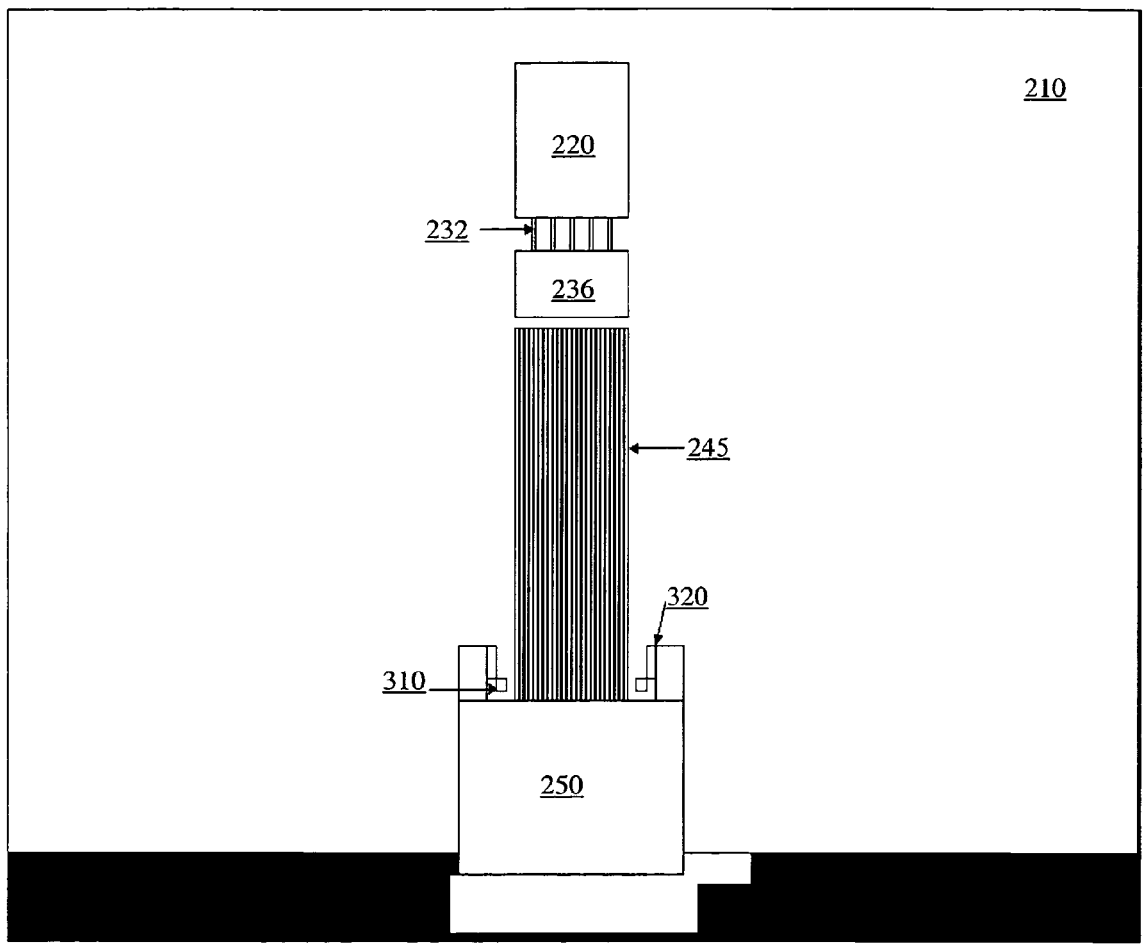
FIG. 3 illustrates a top view of one embodiment of an integrated optical package.

FIG. 3 illustrates a top view of one embodiment of optical sub-assembly mounted on substrate 210. As shown in FIG. 3, die 236 may be directly aligned with waveguide 245 since waveguide 245 is patterned as a component of the substrate 210 package, without the need for turning mirrors or other alignment aids.

Further, FIG. 3 illustrates mechanisms implemented to mount connector 250 to substrate 210. Connector 250 includes locking mechanisms 310, which locks and aligns connector 250 with waveguide 245. In addition, connector 250 includes hooks 320.

Figure 4:
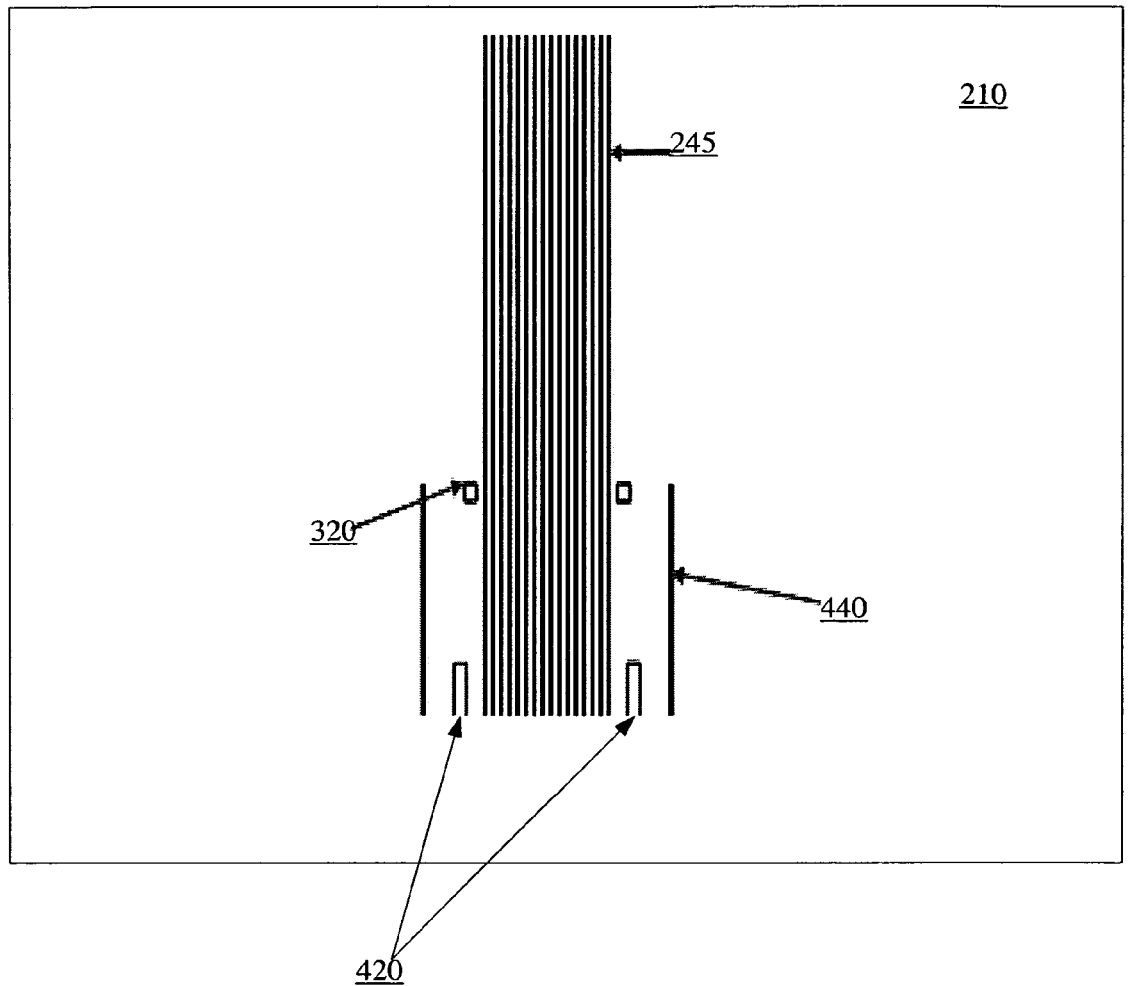
FIG. 4 illustrates a top view of another embodiment of an integrated optical package.

FIG. 4 illustrates a top view of another embodiment of optical sub-assembly mounted on substrate 210. In this embodiment, fabrication of alignment marks 420 and trenches 440 are shown. Alignment marks 420 and trenches 440 are implemented to mount optical connector 250 on substrate 210.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
    a printed circuit board (PCB);
    a substrate mounted on the PCB;
    an integrated circuit (IC) mounted on the substrate;
    an optoelectronic sub-assembly mounted on the substrate, including:
        a flexible high frequency PCB coupled to the IC via the substrate; and
        a metal patterned glass substrate mounted on the second end of the flexible PCB, wherein the flexible PCB has a first end parallel to the substrate and a second end non-parallel to the substrate and parallel to the glass substrate; and
    a waveguide patterned on the substrate, wherein the optoelectronic sub-assembly turns electrons up to establish direct alignment between an optic axis of the optoelectronic IC and the waveguide.

2. The system of claim 1 wherein the optoelectronic subassembly further comprises:
    an optoelectronic IC mounted on the glass substrate.

3. The system of claim 2 wherein the optoelectronic IC is flip chip mounted on the glass substrate.

4. The system of claim 2 wherein the optoelectronic IC is a vertical cavity surface emitting laser (VCSEL).

5. The system of claim 2 wherein the optoelectronic IC is a photodetector.

6. The system of claim 2 wherein the optoelectronic IC is directly aligned with the waveguide.

7. The system of claim 2 further comprising a small form factor (SFF) optical connector mounted on the substrate.

8. The system of claim 7 wherein the optical connector comprises:
    a locking mechanism to lock the optical connector to the substrate; and
    a hook.

9. An optoelectronic sub-assembly comprising:
    a flexible printed circuit board (PCB) having a first end coupled to an integrated circuit (IC) via a first substrate;
    a glass substrate mounted on a second end of the flexible PCB, wherein the first end of the flexible PCB is parallel to the first substrate and the second end is parallel to the glass substrate and non-parallel to the first substrate; and
    an optoelectronic IC, mounted on the glass substrate to establish direct alignment between an optic axis of the optoelectronic IC and a waveguide.

10. The optoelectronic sub-assembly of claim 9 wherein the optoelectronic IC is flip chip mounted on the glass substrate.

11. The optoelectronic sub-assembly of claim 9 wherein the optoelectronic IC is a vertical cavity surface emitting laser (VCSEL).

12. The optoelectronic sub-assembly of claim 9 wherein the optoelectronic IC is a photodetector.

13. The optoelectronic sub-assembly of claim 9 wherein the substrate is a glass substrate.

14. A method comprising:
    patterning a waveguide on a substrate;
    mounting an integrated circuit (IC) on the substrate; and
    mounting an optoelectronic sub-assembly on the substrate to establish direct alignment between an optic axis of the optoelectronic IC and the waveguide by:
        coupling a first end of a flexible printed circuit board (PCB) to the IC via the substrate; and
        mounting a glass substrate on a second end of the flexible PCB non-parallel to the substrate, wherein the flexible PCB has a first end parallel to the substrate and a second end non-parallel to the substrate and parallel to the glass substrate.

15. The method of claim 14 wherein mounting the optoelectronic sub-assembly further comprises:
    mounting an optoelectronic IC on the glass substrate.

16. The method of claim 15 further comprising mounting an optical connector on the substrate.

17. The method of claim 16 wherein mounting the optical connector on the substrate comprises:
    aligning the optical connector with the waveguide; and
    locking the optical connector on the substrate.

18. The method of claim 16 further comprising mounting the substrate on a printed circuit board (PCB).

* * * * *